FULLY CHECKABLE ADDER
Filed March 7, 1962
FIG. 1
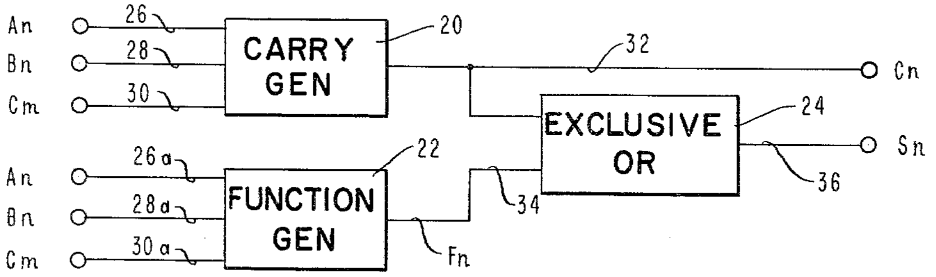
FIG. 2
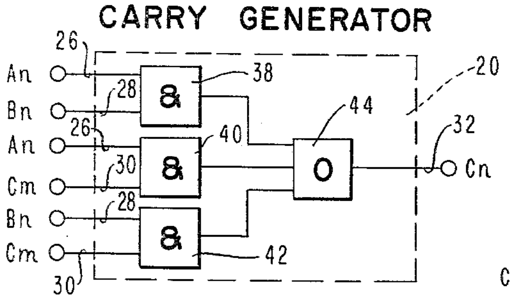
FIG. 3
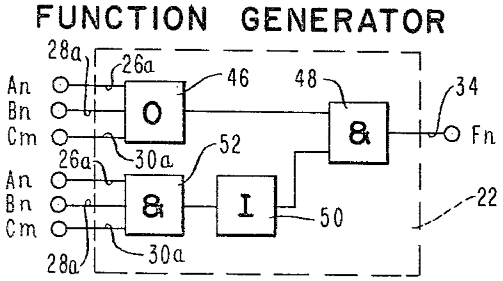
FIG. 4
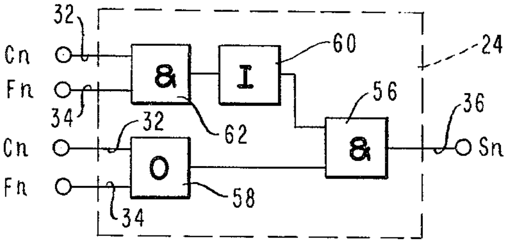
FIG. 5
| | | CARRY CORRECT | | CARRY ERRONEOUS | |
|---|---|---|---|---|---|
| | | Sn | Cn | Sn | Cn |
| 1 | $\overline{An}$ $\overline{Bn}$ $\overline{Cm}$ | 0 | 0 | 1 | 1 |
| 2 | $\overline{An}$ $\overline{Bn}$ Cm | 1 | 0 | 0 | 1 |
| 3 | $\overline{An}$ Bn Cm | 0 | 1 | 1 | 0 |
| 4 | An Bn Cm | 1 | 1 | 0 | 0 |
| 5 | An Bn $\overline{Cm}$ | 0 | 1 | 1 | 0 |
| 6 | An $\overline{Bn}$ $\overline{Cm}$ | 1 | 0 | 0 | 1 |
INVENTORS
FREDERICK F. SELLERS, JR.
MU-YUE HSIAO
BY Melvin P. Williams
ATTORNEY

United States Patent Office 3,234,373

Patented Feb. 8, 1966

3,234,373

FULLY CHECKABLE ADDER

Frederick F. Sellers, Jr., and Mu-Yue Hsiao, Poughkeepsie, N.Y., assignors to International Business Machines Corporation, New York, N.Y., a corporation of New York Filed Mar. 7, 1962, Ser. No. 178,009
2 Claims. (Cl. 235—176)

This invention relates to adder circuits, and more particularly to an improved adder of the type in which the sum output is generated as a function of the carry output so as to facilitate fully checking the operation of the adder by checking the parity of the sum output thereof only.

In the data processing art, it is frequently necessary to provide means for adding together respective digits of two or more numbers. The digits in one order of each number may be applied to the adder serially, one after the other, or may be applied to the adder over a plurality of connections simultaneously. Regardless of which method is used, it has been found that adders generally comprise one or more stages each capable of adding the respective digits of one order of each number, together with the carry output result from an addition performed on the next lower order of the numbers.

As it is well known in the data processing art, computations performed may be tested for accuracy by performing what is known as a "parity check." A parity check comprises determining that a unit of data has either an odd or even number of ONES in it and in comparing this determination with the fact that corresponding data, as it existed in a prior form or at a prior time, had either an odd or even number of ONES in it. In a single stage adder, the prediction of the parity of the sum output signal on the basis of the digit input signals is well known. Similarly, adders have been made which predict the parity of the final sum in part on the basis of carry information, regardless of the type of carry (ripple, carry lookahead, etc.) which is used. However, this latter type of circuit is very complex, and unless the performance requirements of a computer justify the complexity, the cost may be prohibitive.

In order to provide a simpler adder stage which provides some means of checking the effect of carries on the final sum, it has been proposed to generate the sum output signal for each stage in response to a carry output signal generated for that stage in one such device known in the prior art, a plurality of first logic circuits generate a carry output signal and generate a plurality of different functions in response to the inputs to the adder stage. Thereafter, the carry output signal is combined in a second plurality of logic circuits with the various functions of the input signals. In this manner, the sum output signal is generated in response to the generated carry output signal for any combination of digit input signals and carry input signals. However, since the same first plurality of logic circuits generates the carry output signal as well as the function signals to be combined therewith, it is possible that a single error in the first plurality of logic circuits will be cancelled out by the second plurality of logic circuits, thereby hiding the fact that an error has occurred, even if their is NO error in the second plurality of logic circuits.

Therefore, it is the primary object of this invention to provide an improved adder stage wherein the sum output signal is dependent upon the carry output signal thereof.

Another object of the invention is to provide an improved adder wherein the possibility of undetected single errors is minimized.

A further object is to provide an improved adder stage wherein the carry output signal is generated independently of the generation of any other functions of the signal input to the adder stage, and the sum output signal is generated in dependence upon the carry output signal and additional functions of the input signals.

This invention is predicated on the concept that the sum output signal of an adder stage can be expressed as a known function of the carry output signal from the same adder stage.

In accordance with the present invention, a carry output signal is generated in an adder stage, and this is combined in an EXCLUSIVE OR circuit with the output from independent logic circuits which generate special functions of the input signal. The output of the EXCLUSIVE OR circuit is the sum output signal of the adder stage. The independent function which is combined in the EXCLUSIVE OR circuit with the independently-generated carry output signal may be expressed in the following (or equivalent) Boolean notation:

$$(\bar{A}+\bar{B}+\bar{C})\cdot(A+B+C)$$

This invention reduces the possibility that the single error will cause both the carry and the sum to be in error in such a fashion as to be undetectable. The only possible undetectable errors are those which result from TWO errors occurring simultaneously, one in the carry generator and one in the function generator or EXCLUSIVE OR circuit; these errors may cancel each other out, making the sum correct when the carry is incorrect. The statistical probability of this occurring is extremely remote, and therefore, any adder designed in accordance with the present invention is inherently quite reliable.

The foregoing and other objects, features and advantages of the invention will be apparent from the following more particular description of a preferred embodiment thereof, as illustrated in the accompanying drawings.

In the drawings:

FIG. 1 is a schematic block diagram of a fully checked adder in accordance with the present invention;

FIG. 2 is a schematic block diagram of a carry generator suitable for use in the embodiment shown in FIG. 1;

FIG. 3 is a schematic block diagram of a function generator suitable for use in the embodiment shown in FIG. 1;

FIG. 4 is a schematic block diagram of an EXCLUSIVE OR circuit suitable for use in the embodiment shown in FIG. 1;

FIG. 5 is a chart illustrating the operation of the embodiment shown in FIG. 1.

Referring now to FIG. 1, a fully checked adder circuit comprises a CARRY GENERATOR 20 which responds to digit-representing input signals $A_n$ and $B_n$ on respective input connecting lines 26, 28, and a carry input signal $C_m$ on an input connecting line 30. The output $C_n$ of the CARRY GENERATOR 20, on a line 32, is applied to the input of the EXCLUSIVE OR circuit 24.

A FUNCTION GENERATOR 22 responds to the signals representing input digits $A_n$ and $B_n$ on lines **26*a* and 28*a*, as well as to the carry input signal $C_m$ on a line 30*a*, which are identical to the inputs to the CARRY GENERATOR 20 on the lines 26, 28 and 30, respectively. The output $F_n$ of the FUNCTION GENERATOR 22, on a line 34, is applied to the input of the EXCLUSIVE OR circuit 24. The EXCLUSIVE OR circuit 24 will supply an output sum signal $S_n$ on the line 36**. The contents of the individual blocks are described hereinafter with respect to FIGS. 2–4.

In FIG. 2 is shown the CARRY GENERATOR 20 which comprises three AND circuits 38, 40 and 42, each feeding an OR circuit 44. The inputs of the AND circuit 38 comprise the input digit signals A*n* and B*n* on lines 26 and 28, respectively. The inputs to the AND circuit 40 comprise the digit input signal A*n* on line 26 and the carry input signal C*m* on line 30. The inputs to the AND circuit 42 comprise the digit input signal B*n* on line 28 and the carry input signal C*m* on the line 30. The output of the OR circuit 44 comprises the carry output signal C*n* on the line 32.

In operation, any one of the AND circuits 38, 40 or 42 can supply an output signal to the OR circuit 44 whenever both of its input signals are present simultaneously. Thus, if two or three out of the possible three input signals are present at the input to the AND circuits 38, 40, 42, then there will be a carry output signal C*n* on the line 32 (developed by the OR circuit 44). Stated alternatively, the carry output signal C*n* is an indication of the presence of two or more of the input signals to the CARRY GENERATOR 20.

In FIG. 3, the FUNCTION GENERATOR 22 comprises an OR circuit 46, the output of which is connected to the input of an AND circuit 48, which also responds to the output of an inverter 50, the input of which is connected to the output of an AND circuit 52. The output of the AND circuit 48 comprises the function signal F*n* on the line 34. The inputs to the OR circuit 46 and to the AND circuit 52 comprise the digit input signals A*n*, B*n* on the lines 26*a* and 28*a*, as well as the carry input signal C*m* on the line 30*a*.

In operation, the OR circuit 46 will provide an output signal to the AND circuit 48 whenever any one or more of the input signals are present on the lines 26*a*, 28*a* or 30*a*. In order for there to be an output signal on the line 34 from the AND circuit 48, there must be a signal output from the inverter 50, which in turn requires that there be no output signal from the AND circuit 52. The AND circuit 52 will provide an output signal whenever all three input signals are present on lines 26*a*, 28*a* and 30*a*. Thus the AND circuit 48 will respond to the OR tor 46 impresses positive potential on its swinger 41 and will respond to the inverter 50 whenever there is less than all of the input signals. In other words, the function signal F*n* is indicative of the presence of at least one but less than three of the input signals.

In FIG. 4 is shown an example of an EXCLUSIVE OR circuit 24. This circuit comprises an AND circuit 56 which responds simultaneously to an OR circuit 58 and an inverter 60. Inverter responds to an AND circuit 62 whenever there is a carry output signal C*n* on the line 32 simultaneously with the function signal F*n* on the line 34. The OR circuit 58 will provide an output signal to the AND circuit 56 whenever either (or both) of the carry output signal C*n* or the function signal F*n* is present on the respective one of the lines 32, 34.

In operation, the EXCLUSIVE OR circuit 24 will provide a sum output signal S*n* on the line 36 whenever either one, but not both, of the carry output signal C*n* and the function signal F*n* are present at the inputs thereof. It may be noted therefore that whenever either the carry output signal C*n* or the function signal F*n* are changed from ONE to ZERO or from ZERO to ONE, then the sum signal will likewise be changed from ZERO to ONE or from ONE to ZERO, respectively. Therefore, use of the EXCLUSIVE OR circuit guarantees that the sum signal S*n* will be dependent upon the presence or absence of both the carry output signal C*n* and the function signal F*n*.

An example of the operation of the device is illustrated with respect to FIG. 5. Taking as an example the conditions set forth in row 5 of FIG. 5, both digit input signals A*n* and B*n* will be present, but there will be no carry input signal C*m*. Under this circumstance, there will be an output signal from the AND circuit 38 (FIG. 2), and therefore an output signal from the OR circuit 44 will appear on line 32. Thus, there is a carry output signal C*n* generated in response to the digit input signals A*n*, B*n*. In this example, the OR circuit 46 (FIG. 3) will apply an output signal to the AND circuit 48, and since the AND circuit 52 will be blocked because of the absence of a carry input signal C*m* on line 30*a*, the inverter 50 will also provide an output signal to the AND circuit 48. Therefore, the AND circuit 48 will generate a function signal F*n* on the line 34 in response to the presence of both input digit signals A*n* and B*n*. However, since both signals are present, no sum signal S*n* on line 36 (FIG. 4) will be generated by the AND circuit 56. This is so because there will be no output from the inverter 60 due to the signal applied to the inverter by the AND circuit 62 in response to both the carry and the function signals C*n*, F*n* on lines 32 and 34. Thus, two digit input signals will create a carry output signal but no sum output signal, as before described. However, if the AND circuit 48 (FIG. 3) failed to operate, so that there was no function signal F*n* on the line 34, then the EXCLUSIVE OR circuit (FIG. 4) would generate a sum output signal S*n* on the line 36. This would be an error, but since the invention is predicated on the ability to check errors in the sum, the fact of this error would be detectable in other circuitry (not shown).

Assume in the same example that the function signal F*n* is correctly generated, but that due to a failure within the CARRY GENERATOR 20 (FIG. 2) no carry output signal C*n* is generated on line 32. In this instance, the EXCLUSIVE OR circuit 24 (FIG. 4) would respond to only one input signal (F*n*, on line 34) and therefore would generate a sum output signal S*n* on line 36. This output signal would be an error, and would similarly be detectable by the checking circuitry with which this adder is to be used.

Assuming the same example as hereinbefore, if both the carry output signal C*n* on line 32 and the functional signal F*n* on the line 34 are correctly generated, but due to some failure in the EXCLUSIVE OR circuit, a sum output signal S*n* is generated on line 36, this will of course be an error, and will be detected by the sum error detection circuitry as in the other cases.

Assume the same example and also assume that an error occurs in each of the circuits: In this circumstance, there should be no function signal F*n* generated and the EXCLUSIVE OR circuit should give a sum output signal S*n*. If neither a function signal F*n* nor a carry output signal C*n* is generated, then the EXCLUSIVE OR circuit should normally generate no output signal S*n*. But, if the EXCLUSIVE OR circuit also fails, then it *would* generate a sum output signal S*n*. This would be a detectable error, as before. Thus it can be seen that an error in all three of the circuits will give a detectable erroneous sum signal.

Therefore, an error in any one or all of the three main portions of this adder will be detectable by checking the parity of the sum output signal S*n*. It follows therefore that the only types of errors which will not be detected are simultaneous errors in two of the circuits.

From the foregoing, it can be seen that the statistical chance of a correct sum signal being generated when an erroneous carry signal is generated is extremely small. Therefore, the circuit can be relied on to indicate a carry error by forcing an error in the sum, therefore permitting checking the carry by means of sum checking circuitry.

The foregoing embodiment is intended to be exemplary only. Obviously, any EXCLUSIVE OR circuit capable of generating an output in response to one and only one of two input signals may be utilized. Similarly, any circuits capable of giving the Boolean equivalent to the function $(\overline{An}+\overline{Bn}+\overline{Cm})\cdot(An+Bn+Cm)$ may be utilized in place of the function generator 22 shown in FIG. 3. Also, it may be possible to use an out of phase output from the AND circuit 52 in place of the inverter 50; due to the type of transistor or other circuitry employed, it may be easier to use complement inputs into an OR circuit in place of the true inputs into the AND circuit 52, as shown. Other obvious substitutions may be provided. In a similar fashion, the nature of the carry generator is completely immaterial, any carry generator suitable of providing the carry output signal in response to two digit input signals and a carry input signal may be utilized, all as is well within the skill of the electronic computer art.

While the invention has been particularly shown and described with reference to a preferred embodiment thereof, it will be understood by those skilled in the art that the foregoing and other changes in form and details can be made therein without departing from the spirit and scope of the invention.

What is claimed is:

1. A fully checkable adder circuit stage to which are presented input manifestations of a plurality of data bits and at least one carry input bit, comprising:

means responsive only to concurrent presentation of a group of manifestations which consists of at least one but less than all of said input manifestations to generate a function signal;

means responsive to a concurrent presentation of more than one of said input manifestations to generate a signal representing a carry output bit, said carry output bit signal being the carry output from said adder circuit stage;

and means concurrently responsive only to said function signal and said carry output bit signal for generating a manifestation of a sum output from said adder stage.

2. A fully checkable adder circuit stage to which are presented input manifestations of first and second data bits and a first carry bit, comprising:

means responsive only to concurrent presentation of a group of manifestations which consists of at least one but less than all of said input manifestations to generate a function signal;

means responsive to a concurrent presentation of at least two of said input manifestations to generate a second carry bit signal, said second carry bit signal being the carry output from said adder circuit stage;

and means concurrently responsive to said function signal and to said second carry bit signal for generating a manifestation of a sum output from said adder stage in response to one and only one of said signals being presented thereto.

References Cited by the Examiner

UNITED STATES PATENTS

| | | | |
|---|---|---|---|
| 2,888,202 | 5/1959 | Blankenbaker | 235—176 |
| 2,927,733 | 3/1960 | Campbell | 307—88.5 |
| 3,113,206 | 10/1963 | Harel | 235—176 |

ROBERT C. BAILEY, *Primary Examiner.*

MALCOLM A. MORRISON, *Examiner.*